United States Patent
Park et al.

(10) Patent No.: US 9,307,177 B2
(45) Date of Patent: Apr. 5, 2016

(54) APPARATUS AND METHOD FOR PROVIDING GRAPHIC USER INTERFACE

(75) Inventors: Jung-bum Park, Seoul (KR); Jun-ho Hwang, Seoul (KR); Kyu-seok Kang, Seoul (KR); Sun-young Kim, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 976 days.

(21) Appl. No.: 12/591,355

(22) Filed: Nov. 17, 2009

(65) Prior Publication Data

US 2010/0185988 A1     Jul. 22, 2010

(30) Foreign Application Priority Data

Jan. 22, 2009  (KR) .......................... 10-2009-005616

(51) Int. Cl.
| | |
|---|---|
| G06F 3/048 | (2013.01) |
| H04N 5/44 | (2011.01) |
| G06F 3/0482 | (2013.01) |
| H04N 21/431 | (2011.01) |
| H04N 21/482 | (2011.01) |
| H04N 21/488 | (2011.01) |
| H04N 21/81 | (2011.01) |

(52) U.S. Cl.
CPC ............ *H04N 5/4403* (2013.01); *G06F 3/0482* (2013.01); *H04N 21/4316* (2013.01); *H04N 21/482* (2013.01); *H04N 21/488* (2013.01); *H04N 21/8126* (2013.01)

(58) Field of Classification Search
None
See application file for complete search history.

(56) References Cited

U.S. PATENT DOCUMENTS

| | | | | |
|---|---|---|---|---|
| 6,072,535 | A * | 6/2000 | Kearns | 348/563 |
| 6,151,059 | A * | 11/2000 | Schein et al. | 725/37 |
| 6,292,188 | B1 * | 9/2001 | Carlson et al. | 715/854 |
| 6,392,709 | B1 | 5/2002 | Orito | |
| 6,538,698 | B1 * | 3/2003 | Anderson | 348/333.05 |
| 6,678,891 | B1 * | 1/2004 | Wilcox et al. | 725/42 |
| 6,690,391 | B1 * | 2/2004 | Kim et al. | 715/720 |
| 7,076,734 | B2 * | 7/2006 | Wolff et al. | 715/720 |
| 7,577,917 | B2 * | 8/2009 | Vong | 715/767 |

(Continued)

FOREIGN PATENT DOCUMENTS

| | | |
|---|---|---|
| JP | 11-155110 | 6/1999 |
| JP | 2006-203535 | 8/2006 |

(Continued)

OTHER PUBLICATIONS

Republic of Korea Office Action dated Dec. 26, 2014, for Application No. 088721883.

*Primary Examiner* — Stephen Alvesteffer
(74) *Attorney, Agent, or Firm* — Harness, Dickey & Pierce, P.L.C.

(57) ABSTRACT

An apparatus and method for providing a graphic user interface which is used in a display device operated by a remote controller are provided. A graphic user interface screen includes a main information display area for displaying main information in the form in which a plurality of main elements are recursively disposed and a sub-information display area for displaying sub-information including supplementary information according to information provided on the main information display area. At least one sub-element included in a main element is operated by a direction selection signal which indicates a direction perpendicular to a disposition direction of the main elements.

17 Claims, 6 Drawing Sheets

(56) References Cited

U.S. PATENT DOCUMENTS

| | | | |
|---|---|---|---|
| 8,120,580 B2* | 2/2012 | Yamaji et al. | 345/161 |
| 2003/0070171 A1 | 4/2003 | Jeon et al. | |
| 2004/0100479 A1* | 5/2004 | Nakano et al. | 345/700 |
| 2005/0022136 A1* | 1/2005 | Hatscher et al. | 715/798 |
| 2005/0204311 A1* | 9/2005 | Kim | 715/823 |
| 2006/0015826 A1* | 1/2006 | Shiozawa et al. | 715/864 |
| 2006/0020970 A1* | 1/2006 | Utsuki et al. | 725/39 |
| 2006/0101338 A1* | 5/2006 | Kates | 715/716 |
| 2006/0242596 A1* | 10/2006 | Armstrong | 715/786 |
| 2007/0044036 A1* | 2/2007 | Ishimura et al. | 715/810 |
| 2007/0162853 A1* | 7/2007 | Weber et al. | 715/719 |
| 2007/0164989 A1* | 7/2007 | Rochford et al. | 345/156 |
| 2007/0180404 A1* | 8/2007 | Gandolph et al. | 715/825 |
| 2008/0028337 A1* | 1/2008 | Michaud et al. | 715/810 |
| 2008/0068340 A1* | 3/2008 | Landschaft et al. | 345/169 |
| 2009/0073118 A1* | 3/2009 | Yamaji et al. | 345/161 |
| 2009/0117945 A1* | 5/2009 | Mahler et al. | 455/569.1 |
| 2010/0037180 A1* | 2/2010 | Elias et al. | 715/840 |

FOREIGN PATENT DOCUMENTS

| | | |
|---|---|---|
| KR | 2003-0030054 | 4/2003 |
| KR | 10-2004-0066222 | 7/2004 |
| KR | 10-20060028160 | 3/2006 |
| KR | 2006-0026266 A | 3/2006 |
| WO | WO2004102285 | 11/2004 |
| WO | 2006/112894 | 10/2006 |

* cited by examiner

APPARATUS AND METHOD FOR PROVIDING GRAPHIC USER INTERFACE

CROSS-REFERENCE TO RELATED APPLICATIONS

This application claims the benefit under 35 U.S.C. §119 (a) of Korean Patent Application No. 10-2009-5616, filed on Jan. 22, 2009, the disclosure of which is incorporated herein in its entirety by reference.

FIELD

One or more embodiments relate to a graphic user interface, and more particularly, to an apparatus and method for providing a graphic user interface used in a display device controlled by a remote controller.

DESCRIPTION OF THE RELATED ART

Generally, a user uses a set-top box and a display device at a position distant therefrom. As the size of display devices increase, the distance between the set-top box or display device and a user increases. As the performance of the set-top box and demands from users increase, functions thereof continue to diversify. In recent years, in order to provide convenient use of the apparatus, an attempt at a user interface for a remote controller has been made. However, when a user interface used in a personal computer environment or a menu method used in a touch interface is applied to a user interface for a remote controller, it is difficult for a user to efficiently select from a menu.

SUMMARY

One or more embodiments relate to an apparatus and method for providing a user graphic interface in which, in a display device operated through a remote controller, information is efficiently provided, so that efficiency of retrieving and selecting information increases.

In one or more embodiments, there is provided a graphic user interface providing apparatus including a screen configuring unit and a controller. The screen configuring unit configures a screen to include a main information display area for displaying main information in the form in which a plurality of main elements are recursively disposed and a sub-information display area for displaying sub-information including supplementary information according to information provided on the main information display area. The controller controls the screen configuring unit according to a user input signal. When a main element selection signal for selecting one of the plurality of main elements is received, the controller controls the screen configuring unit to provide at least one sub-element on an area for representing the selected main element, and the sub-element is operated by a direction selection signal which indicates a direction perpendicular to a disposition direction of the main elements.

When a direction selection signal which indicates a direction identical to a disposition direction of the main elements included in the main information display area is input, the controller may control the screen configuring unit to recursively move the main elements in a direction indicated by the direction selection signal. When the direction selection signal lasts for a predetermined time period, the controller may control the screen configuring unit to accelerate movement of the main elements.

The supplementary information may include at least one of user guide information according to the main information and notice information, and the sub-information display area may be divided into two or more areas.

The main information display area may include a sub-area for providing information which represents a setting state of the main element or information which enables fast execution of the main element, and the sub-area may be selected by the direction selection signal which indicates the direction perpendicular to the disposition direction of the main elements.

The screen configuring unit may display information which represents a state of the sub-element on a straight line, and the controller may control the screen configuring unit to indicate information corresponding to a sub-element selected by a direction selection signal of a direction identical to a straight line direction on the straight line. Information which represents a state of the sub-element may be a setting value used for execution of the sub-element.

When a plurality of sub-elements are present, the screen configuring unit may configure a screen to display category information for categorizing the sub-elements on a straight line, and the controller may control the screen configuring unit to move the sub-elements according to a direction selection signal of a direction identical to a straight line direction on the screen and to indicate the category information of a sub-element which is currently being focused on the straight line.

When a plurality of sub-elements are included in a main element selected from among the plurality of main elements according to a user input signal, if the plurality of main elements are disposed in a vertical direction, the plurality of sub-elements may be disposed in a horizontal direction, and if the plurality of main elements are disposed in a horizontal direction, the plurality of sub-elements may be disposed in a vertical direction.

When at least one sub-element is provided on the main element display area selected by a user input signal, an expression of at least one main element neighboring the selected main element may be continuously maintained on the screen for a user to recognize a position of the main element.

When a main element selection signal for selecting one of the plurality of main elements is received, the controller may control the screen configuring unit to expand an area which represents the selected main element and provide at least one sub-element on the expanded area.

In one or more embodiments, there is provided a method of providing a graphic user interface. The method includes providing a screen to include a main information display area for displaying main information in the form in which a plurality of main elements are recursively disposed and a sub-information display area for displaying sub-information including supplementary information according to information provided on the main information display area, receiving a main element selection signal for selecting one of the plurality of main elements, and providing at least one sub-element on an area which represents the selected main element. The sub-element is operated by a direction selection signal which indicates a direction perpendicular to a disposition direction of the main elements.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

Figure 1:
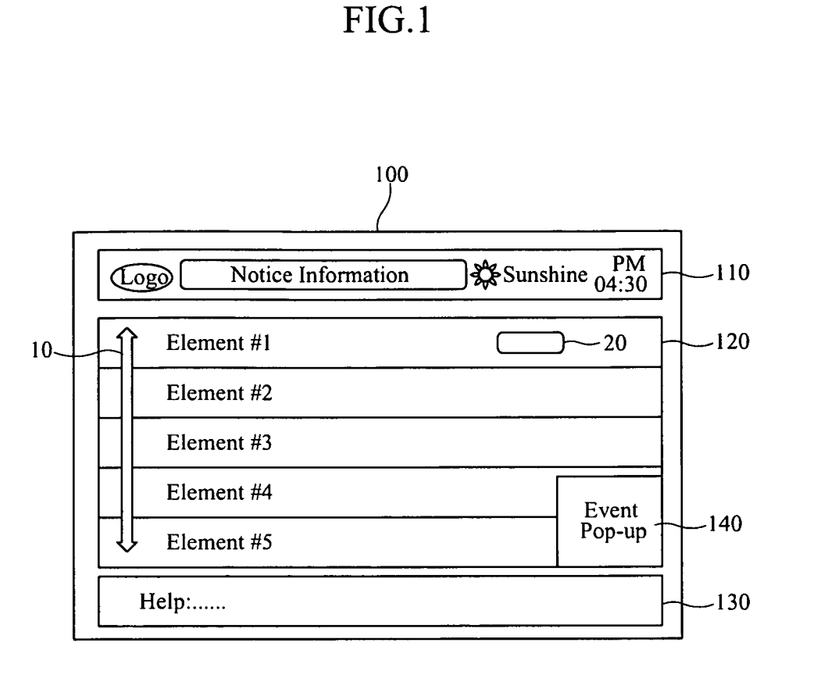
FIG. 1 is a view illustrating an exemplary user interface screen which is remotely controlled.

FIG. 1 is a view illustrating an exemplary user interface screen which is remotely controlled.

A graphic user interface screen 100 of FIG. 1 illustrates an initial screen of a user interface screen. The screen 100 includes a main information display area 120 and sub-information display areas 110 and 130.

Main information (or elements) disposed in the form in which a plurality of main elements are recursively disposed is displayed on the main information display area 120. The recursive disposition means that elements are displayed in the form in which a first element is disposed again behind a last element. For example, in the case in which a user recursively shifts focus for elements disposed in a row through a remote controller, if a user shifts focus from a last element to a next element in the same way, a first element is focused on.

Main elements displayed on the main information display area 120 are recursively moved in a direction instructed by a direction selection signal which instructs a direction which is identical to a disposition direction 10. When the direction selection signal lasts for a predetermined time period, a feedback screen in which movement of the main elements is accelerated may be provided.

As illustrated in FIG. 1, the sub-information display areas 110 and 130 may be positioned above and below the main information display area 120, respectively. User guide information according to information provided on the main information display area 120 is displayed on the lower sub-information display area 130. The user guide information may be help information as illustrated in FIG. 1. For example, as help information for helping a user retrieve and select an element on the screen of FIG. 1, help information which states "select a menu using an up or down selection button" may be displayed. When one of the main elements is focused on, description information for the focused element may be provided as user guide information. The user guide information may be continuously provided according to circumstances to minimize inconvenience which a user feels when using the graphic user interface.

Referring to FIG. 1, on the upper sub-information display area 110, notice information such as event information which is provided to a user from a service provider is displayed, and information which represents supplementary information such as a logo of a service provider, weather, and current time may be displayed.

The main information display area 120 may include a sub-area 20 for providing information which represents a setting state of a main element or information which allows fast execution of a main element. The sub-area 20 may be selected using a direction selection signal generated when a direction selection key which instructs a direction perpendicular to a disposition direction of a main element is input.

For example, when the graphic user interface is employed in a home network system, "temperature", "ventilation", and "lighting" may be included as main elements, and the sub-area 20 may display setting states of current main elements such as "24° C.," "low ventilation," and "all lights on". When the main elements are disposed in a vertical direction as illustrated in FIG. 1, a user may operate setting of the sub-area 20 using a horizontal direction selection key, for example, a left and right selection buttons. For example, when a right selection button is pressed one time, the sub-area 20 is focused on, and when it is pressed once more, a feedback screen in which "low ventilation" is changed to "medium ventilation" may be provided.

Event information provided in real time to a user such as information which notifies alarm time which is set may be provided on an event pop-up area 140. The event information may be provided for a short time period and then disappear.

Figure 2:
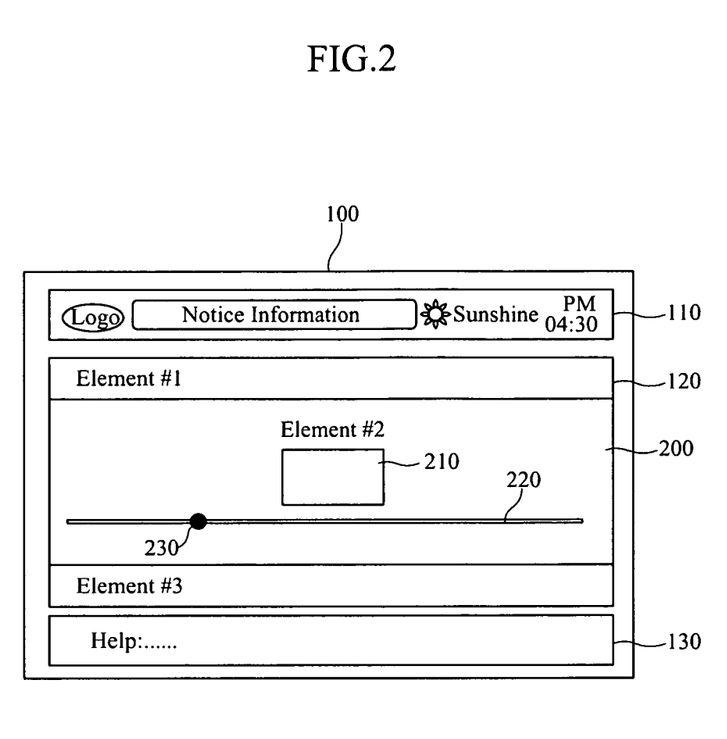
FIG. 2 is a view illustrating an exemplary user interface when a main element is selected from the screen of FIG. 1.

FIG. 2 is a view illustrating an exemplary user interface when a main element is selected from the screen of FIG. 1.

When a main element selection signal for selecting one of a plurality of main elements is received, an area which represents the selected main element is expanded, and at least one sub-element is provided on the expanded area in a direction perpendicular to a disposition direction of the main elements. The sub-element is operated by a direction selection signal which instructs a direction perpendicular to a disposition direction of the main elements. FIG. 2 illustrates a screen when a main element #2 is selected.

Information which represents a state of a sub-element is displayed in a straight line 220, and information corresponding to a state of a sub-element selected according to a direction selection signal of a direction identical to a straight line direction may be indicated on the straight line 220. That is, information corresponding to a state of a sub-element may be positioned on the straight line by an indicator 230.

Information corresponding to a state of a sub-element may be a setting value related to execution of a sub-element. In this case, the setting value may be a value which can be represented by a number such as time or temperature, and numbers may be displayed at a regular interval below the straight line 220 to provide a user with information necessary for setting. When a plurality of sub-elements are present, information corresponding to a sub-element may be category information for categorizing a plurality of sub-elements such as attribute information of a sub-element.

The setting value may be changed according to a direction selection signal of a direction identical to a straight line 220 direction and displayed. The setting value which represents a state of a current sub-element may be displayed at a certain position on the straight line 220 through the indicator 230.

As illustrated in FIG. 2, when the main element #2 is selected and so at least one sub-element is provided, the expression of at least the main elements neighboring the selected main element, that is, the expression of the main element #1 and the expression of the main element #3 are continuously maintained. The neighboring main elements may be displayed by graphic elements different from graphic elements displayed on the initial screen of FIG. 1.

Figure 3:
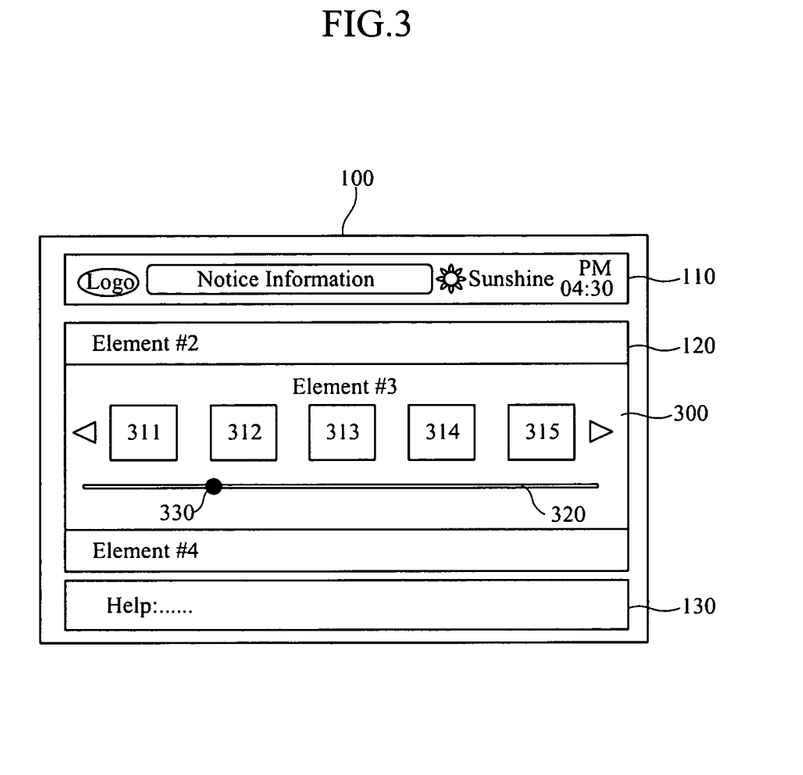
FIG. 3 is a view illustrating another exemplary user interface screen according to when a main element is selected from the screen of FIG. 1.

FIG. 3 is a view illustrating an exemplary user interface screen when a main element is selected from the screen of FIG. 1.

FIG. 3 illustrates a screen when a main element #3 is selected. As illustrated in FIG. 3, when a plurality of sub-elements 311 to 315 are present, the sub-elements 311 to 315 may be disposed in a direction perpendicular to a direction in which a plurality of main elements are recursively disposed. For example, the sub-elements move to the left according to a right selection signal, and at the same time, a sub-element at the leftmost side disappears, and a next sub-element which is hidden may appear from the right.

In this case, category information for categorizing a sub-element is displayed on the straight line 320, and sub-elements are moved on the screen according to a direction selection signal of a direction identical to a straight line direction. Category information for a sub-element which is currently being focused on is indicated on the straight line 320 by the indicator 330.

For example, when the main element #3 is an item for convenient facilities of a building, and sub-elements are information which represent various convenient facilities within the building, information for various convenient facilities can be categorized according to a story. In this case, convenient facility information which is being focused on may be provided together with information of a corresponding story disposed on the straight line 320. When the main element #3 is an item for a movie, and sub-elements are information which represent movie contents, movie contents which are being focused on may be provided together with genre information displayed on the straight line 320.

Figure 4:
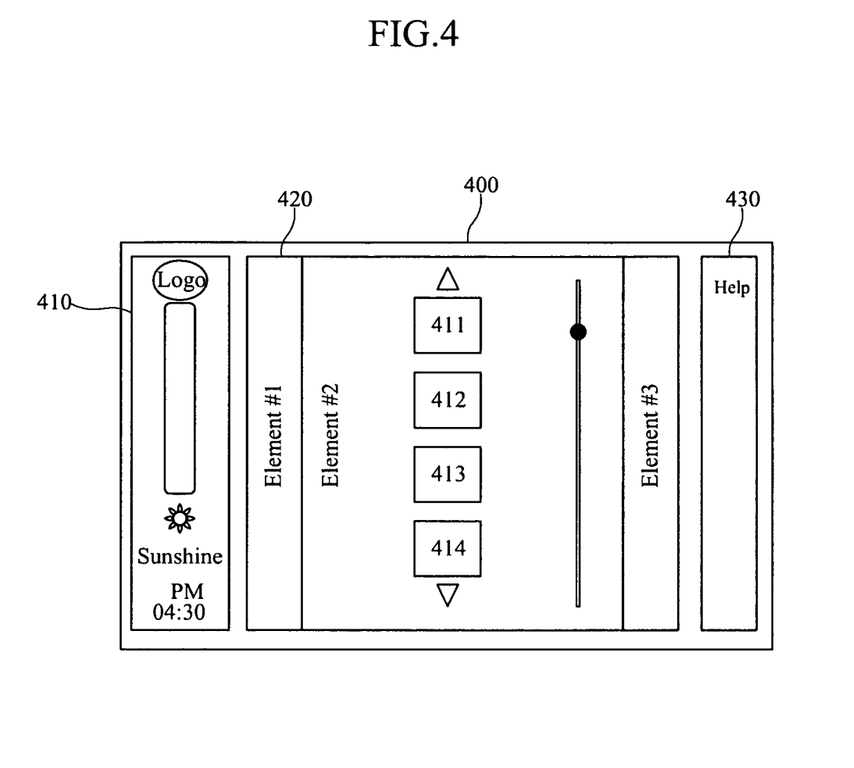
FIG. 4 is a view illustrating another exemplary user interface screen which is remotely controlled.

FIG. 4 is a view illustrating an exemplary user interface screen which can be remotely controlled.

Referring to FIG. 4, unlike the graphic user interface illustrated in FIGS. 1 to 3, a plurality of main elements are recursively disposed in a horizontal direction, a plurality of sub-elements 411 to 414 included in a main element (a main element #2) selected from among the main elements according to a user input are present, and the sub-elements 411 to 414 are disposed in a vertical direction. Sub-information display areas 410 and 430 have a tall rectangular shape. As illustrated in FIG. 4, the main element and the sub-element may be operated in a direction perpendicular to a direction of an operation of the graphic user interface illustrated in FIGS. 1 to 3.

Figure 5:
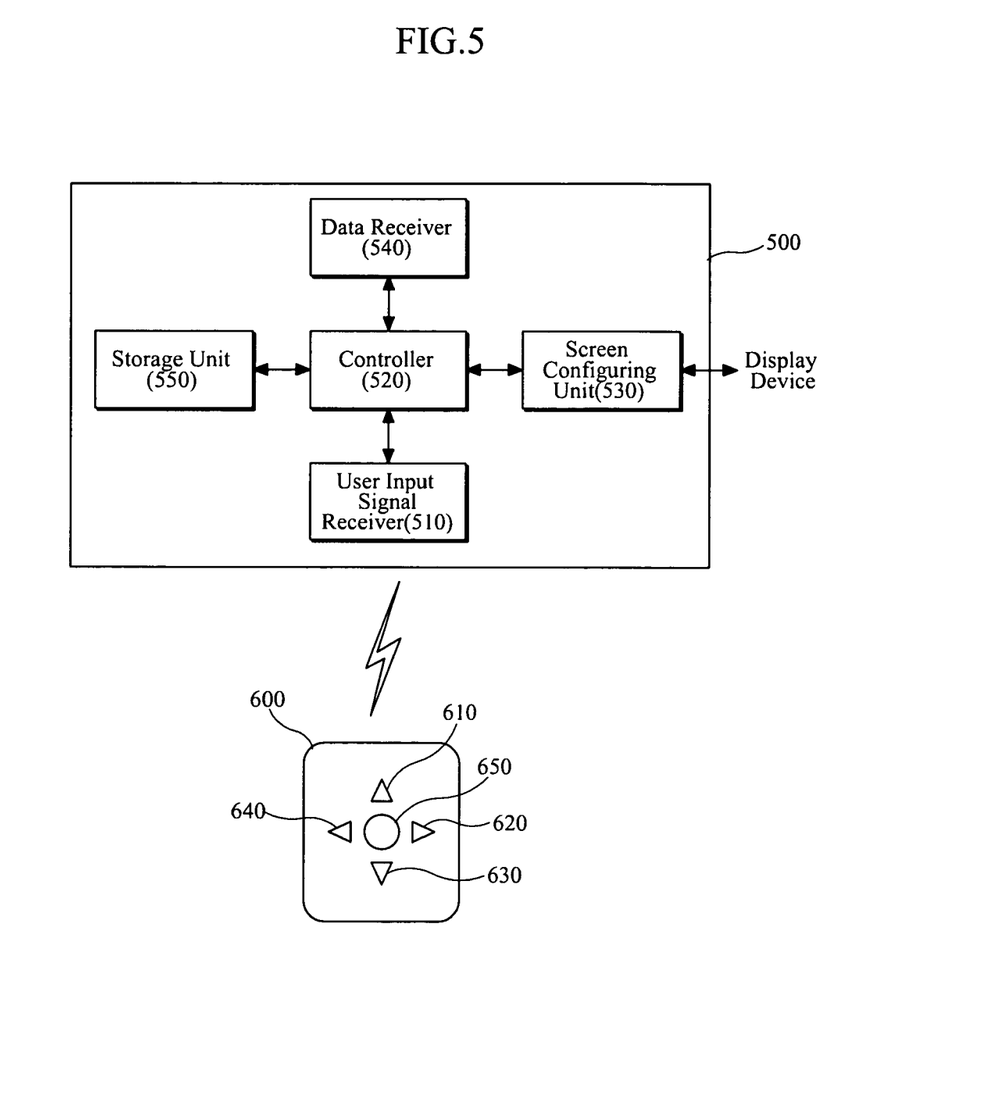
FIG. 5 is a block diagram illustrating an exemplary graphic user interface providing apparatus and a remote controller.

FIG. 5 is a block diagram illustrating an exemplary graphic user interface providing apparatus and a remote controller.

FIG. 5 illustrates a graphic user interface providing apparatus 500 and a remote controller 600. The graphic user interface providing apparatus 500 may be a set-top box-like apparatus which receives a user input signal from the remote controller 600 and outputs a graphic user interface screen on a display device. The graphic user interface providing apparatus 500 may be configured in the form integrated with the display device.

FIG. 5 illustrates exemplary keys for operating the graphic user interface screen in the graphic user interface providing apparatus 500, but the remote controller 600 may be configured to include various functional keys. In one example, the graphic user interface screen may be operated by up, down, left and right selection keys 610, 620, 630, and 640 and a confirmation key 650 of the remote controller 600. The up, down, left and right selection keys 610, 620, 630, and 640 and the confirmation key 650 may be replaced with various user input apparatuses such as a button, a jog shuttle, or a touch pad.

The graphic user interface providing apparatus 500 includes a user input signal receiver 510, a controller 520, a screen configuring unit 530, a data receiver 540, and a storage unit 550.

The user input signal receiver 510 receives a user input signal which is a predetermined radio signal such as an infrared ray signal from the remote controller 600 and identifies the user input signal. The controller 520 controls the screen configuring unit 530 according to the identified user input signal. The screen configuring unit 530 configures a screen for the graphic user interface and generates a feedback screen corresponding to control of the controller 520. The data receiver 540 externally receives contents corresponding to an element via a broadcasting network or a communication network. The data receiver 540 may be optionally provided. The storage unit 550 stores information for identifying the radio signal received from the remote controller 600, an application necessary for an operation of the graphic user interface providing apparatus 500, and other contents.

The screen configuring unit 530 configures a screen which includes a main information display area for displaying main information disposed in the form in which a plurality of main elements are recursively disposed and a sub-information display area for displaying sub-information according to information provided on the main information display area. The sub-information display area provides the user with guide information and notice information to be notified to the user, and a notice information providing area for providing notice information and guide information may be separately positioned.

The main information display area may include a sub-area for providing information which represents a setting state of a main element or information which enables fast execution for changing a setting corresponding to a main element. The sub-area may be selected using a direction selection key which indicates a direction perpendicular to a disposition direction of main elements.

When a main element selection signal for selecting one of a plurality of main elements is received, the controller 520 may control the screen configuring unit 530 so that at least one sub-element can be provided on an area which represents the selected main element. At this time, the area which represents the selected main element may be expanded up and down or left and right. The sub-elements are operated by a direction selection signal which indicates a direction perpendicular to a disposition direction of the main elements.

When one sub-element is present, the screen configuring unit 530 displays information which represents a state of a sub-element, and the controller 520 may control the screen configuring unit 530 so that information corresponding to the sub-element which is selected by a direction selection signal of a direction identical to the straight line direction can be indicated on the straight line. Information which represents a state of a sub-element may be a setting value which is used for execution of a sub-element.

When a plurality of sub-elements are present, category information for categorizing the sub-elements may be displayed on the straight line. In this case, the controller 520 may control the screen configuring unit 530 so that sub-elements can be moved on the screen by a direction selection signal of a direction identical to the straight line direction and category information for a sub-element which is currently being focused on can be indicated.

When a direction selection signal which indicates a direction identical to a disposition direction of main elements included in the main information display area is received, the controller 520 controls the screen configuring unit 530 so that the main elements can be recursively moved in a direction indicated by a direction selection signal. When the direction selection signal lasts for a predetermined time period, the controller 520 may control the screen configuring unit 530 so that movement of the main elements can be accelerated.

When a plurality of main elements are recursively disposed in a horizontal direction and a plurality of sub-elements which are included in a main element selected from among the plurality of main elements by a user input signal are presented, the plurality of sub-elements may be disposed in a vertical direction. On the other hand, when a plurality of main elements are recursively disposed in a vertical direction and a plurality of sub-elements which are included in a main element selected from among the plurality of main elements by a user input signal are presented, the plurality of sub-elements may be disposed in a horizontal direction.

When at least one sub-element is provided on the selected main element providing area, the expression of at least one main element neighboring the selected main element may be continuously maintained so that a user can recognize a position of the main element. Therefore, a user can recognize a position of the main element to which the sub-element which is currently being operated belongs while performing an operation of executing the sub-element, and can easily move to a different main element.

Figure 6:
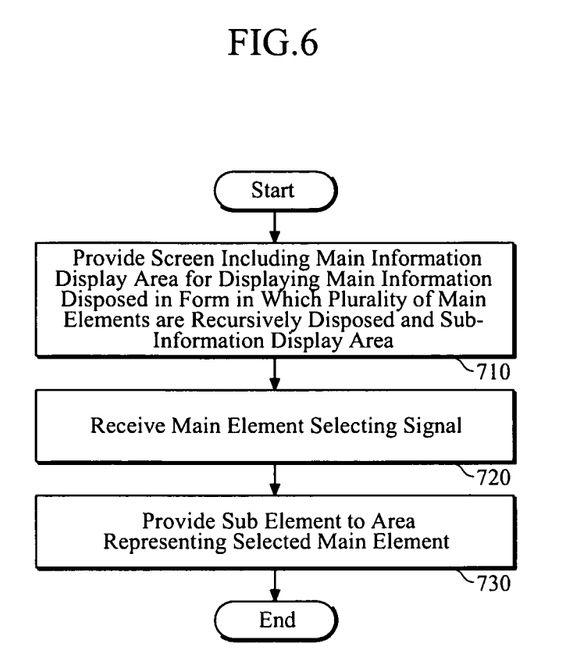
FIG. 6 is a flow chart illustrating an exemplary method of providing a graphic user interface.

FIG. 6 is a flow chart illustrating an exemplary method of providing a graphic user interface.

A screen is provided which includes a main information display area which displays main information disposed in the form in which a plurality of main elements are recursively disposed and a sub-information display area which displays sub-information according to information provided to the main information display area (operation 710). A main element selecting signal for selecting one of a plurality of main elements is received (operation 720). At least one sub-element is provided to an area which represents the selected main element (operation 730). The sub-elements are operated by a direction selection signal which indicates a direction perpendicular to a disposition direction of the main elements.

One or more embodiments can be implemented through a computer readable medium including computer readable code. Code and code segments needed for realizing aspects of embodiments can be easily deduced by one of ordinary skill in the art. The computer readable record medium includes all types of record media in which computer readable data are stored. Examples of the computer readable record medium include a ROM, a RAM, a CD-ROM, a magnetic tape, a floppy disk, and an optical data storage. In addition, the computer readable record medium may be a distributed computer system, e.g., connected through a network, in which computer readable code may be stored and executed in a distributed manner.

As apparent from the above description, a user can be provided with a massive amount of information through a small number of key inputs in a manner similar to a method of selecting a channel on an analog television. Therefore, a user can intuitively retrieve and select diverse information with minimum learning.

While aspects of the present invention has been particularly shown and described with reference to differing embodiments thereof, it should be understood that these exemplary embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A graphic user interface providing apparatus, comprising:
a display device having a display screen;
a screen configuring unit configured to control a screen, the screen including a main information display area for displaying main information in the form in which a plurality of main elements are recursively disposed and a sub information display area for displaying sub information including supplementary information according to information provided on the main information display area; and
a controller configured to control the screen configuring unit according to a user input signal via a touch surface,
wherein when a main element selection signal for selecting one of the plurality of main elements is received, the controller is configured to control the display screen configuring unit to expand an area which represents the selected main element, provide at least one sub element on the expanded area in a direction perpendicular to a disposition direction of the main elements, and display on the display screen a straight line including an indicator, on which information representing at least one of a state associated with a setting value used for executing the at least one sub element and category information associated with the at least one sub element is indicated, and the sub element is operated by a direction selection signal on the touch surface which indicates a direction perpendicular to the disposition direction of the main elements.

2. The graphic user interface providing apparatus of claim 1, wherein when the direction selection signal of the touch surface lasts for a predetermined time period, the controller controls the screen configuring unit to accelerate movement of the main elements.

3. The graphic user interface providing apparatus of claim 1, wherein the supplementary information includes at least one of user guide information according to the main information and notice information, and the sub information display area is divided into two or more.

4. The graphic user interface providing apparatus of claim 1, wherein the main information display area includes a sub area for providing information which represents a setting state of the main element or information which enables fast execution of the main element, and the sub area is selected by the direction selection signal which indicates a direction perpendicular to a disposition direction of the main elements.

5. The graphic user interface providing apparatus of claim 1, wherein when the at least one sub element has a single sub element, the screen configuring unit is configured to display the information representing the state of the single sub element on the straight line, and the controller is configured to control the screen configuring unit to indicate the information corresponding to the single sub element selected by a direction selection signal of a direction identical to a straight line direction on the straight line.

6. The graphic user interface providing apparatus of claim 1, wherein the information which represents the state of the sub element is a setting value used for execution of the sub element.

7. The graphic user interface providing apparatus of claim 1, wherein when a plurality of sub elements including the at least one sub element are present with respect to a corresponding one of the plurality of main elements, the screen configuring unit is configured to display the category information for categorizing the plurality of sub elements on the straight line, and the controller is configured to control the screen configuring unit to move the sub elements according to a direction selection signal of a direction identical to a straight line direction on the straight line on the screen and to indicate the category information of a sub element, from among the plurality of sub elements, which is currently being focused on the straight line.

8. The graphic user interface providing apparatus of claim 1, wherein when a plurality of sub elements are included in a main element selected from among the plurality of main elements according to a user input signal, if the plurality of main elements are disposed in a vertical direction, the plurality of sub elements are disposed in a horizontal direction, and if the plurality of main elements are disposed in a horizontal direction, the plurality of sub elements are disposed in a vertical direction.

9. The graphic user interface providing apparatus of claim 1, wherein when at least one sub element is provided on the main element display area selected by a user input signal, the expression of at least one main element neighboring the selected main element is continuously maintained on the screen for a user to recognize a position of the main element.

10. A method of providing a graphic user interface, comprising:
providing a screen which includes a main information display area for displaying main information in the form in which a plurality of main elements are recursively disposed and a sub information display area for displaying sub information including supplementary information according to information provided on the main information display area;
receiving a main element selection signal via a touch surface for selecting one of the plurality of main elements;
expanding an area which represents the selected main element; and
providing at least one sub element on the expanded area, which represents the selected main element, in a direction perpendicular to a disposition direction of the main elements,
wherein the at least one sub element is operated by a direction selection signal from the touch surface which indicates a direction perpendicular to the disposition direction of the main elements, and when the main element selection signal is received, the method further includes displaying a straight line including an indicator on which information representing at least one of a state associated with a setting value used for executing the at least one sub element and category information associated with the at least one sub element is indicated.

11. The method of claim 10, wherein when the direction selection signal lasts for a predetermined time period, movement of the main elements is accelerated.

12. The method of claim 10, wherein the supplementary information includes at least one of user guide information according to the main information and notice information, and the sub information display area is divided into two or more.

13. The method of claim 10, wherein the main information display area includes a sub area for providing information which represents a setting state of the main element or information which enables fast execution of the main element, and the sub area is selected by the direction selection signal which indicates a direction perpendicular to a disposition direction of the main elements.

14. The method of claim 10, wherein information which when the at least one sub element has a single sub element, the displaying includes displaying the information representing the state of the single sub element on the straight line, and the method further includes selecting the information corresponding to a sub element by a direction selection signal in a direction of the straight line.

15. The method of claim 14, wherein the information which represents the state of the sub element is a setting value used for execution of the sub element.

16. The method of claim 10, wherein when a plurality of sub elements including the at least one sub element are present with respect to a corresponding one of the plurality of main elements, the displaying includes displaying the category information for categorizing the sub elements on the straight line, and the method further comprises moving the sub elements according to a direction selection signal in a direction of the straight line, wherein the category information of a sub element, from among the plurality of sub elements, which is currently being focused on is indicated on the straight line.

17. The method of claim 10, wherein when at least one sub element is provided on the main element display area selected by a user input signal, the expression of at least one main element neighboring the selected main element is continuously maintained on the screen for a user to recognize a position of the main element.

* * * * *